US012488742B2

(12) United States Patent
Chen

(10) Patent No.: US 12,488,742 B2
(45) Date of Patent: Dec. 2, 2025

(54) METHOD, APPARATUS AND DEVICE FOR BRIGHTNESS COMPENSATION OF DISPLAY PANEL

(71) Applicant: KUNSHAN GO-VISIONOX OPTO-ELECTRONICS CO., LTD., Kunshan (CN)

(72) Inventor: Feng Chen, Kunshan (CN)

(73) Assignee: KUNSHAN GO-VISIONOX OPTO-ELECTRONICS CO., LTD., Kunshan (CN)

( * ) Notice: Subject to any disclaimer, the term of this patent is extended or adjusted under 35 U.S.C. 154(b) by 0 days.

(21) Appl. No.: 19/034,618

(22) Filed: Jan. 23, 2025

(65) Prior Publication Data

US 2025/0166560 A1 May 22, 2025

Related U.S. Application Data

(63) Continuation of application No. PCT/CN2022/126254, filed on Oct. 19, 2022.

(30) Foreign Application Priority Data

Aug. 10, 2022 (CN) ......................... 202210956782.0

(51) Int. Cl.
*G09G 3/32* (2016.01)

(52) U.S. Cl.
CPC ....... *G09G 3/32* (2013.01); *G09G 2320/0233* (2013.01); *G09G 2320/0626* (2013.01); *G09G 2360/16* (2013.01)

(58) Field of Classification Search
CPC ............. G09G 3/32; G09G 2320/0233; G09G 2320/0626; G09G 2360/16
See application file for complete search history.

(56) References Cited

U.S. PATENT DOCUMENTS 11,705,029 B1 * 7/2023 Zhang .................. G09G 3/3225 345/694
2020/0103681 A1 * 4/2020 Jung .................... B23K 26/066
(Continued)

FOREIGN PATENT DOCUMENTS

CN 105529002 A 4/2016
CN 107025881 A 8/2017
(Continued)

OTHER PUBLICATIONS

International Search Report of Application No. PCT/CN2022/126254.
Office Action of Chinese Application No. 202210956782.0 Dated Mar. 8, 2023.

*Primary Examiner* — Sejoon Ahn
(74) *Attorney, Agent, or Firm* — Kilpatrick Townsend & Stockton LLP

(57) ABSTRACT

The present application discloses a brightness compensation method, compensation apparatus, and compensation device of display panel, where the display panel includes a first active area and a second active area. The brightness compensation method includes: obtaining actual brightness values of sub-pixels in a preset region of the display panel at a preset grayscale value, and generating an average brightness value; determining a target brightness value of the display panel at the preset grayscale value based on the average brightness value; determining compensation coefficients and compensation values of at least some of sub-pixels in the second active area based on the target brightness value, and the actual brightness values of the sub-pixels in the second active area, and performing brightness compensation on the sub-pixel of the second active area based on a product of the compensation coefficient and the compensation value.

18 Claims, 10 Drawing Sheets

(56) References Cited

U.S. PATENT DOCUMENTS

| | | | | |
|---|---|---|---|---|
| 2020/0271286 | A1* | 8/2020 | Pahlevaninezhad | H05B 45/46 |
| 2020/0273411 | A1* | 8/2020 | Gao | G09G 3/3233 |
| 2020/0273414 | A1* | 8/2020 | He | G09G 3/2018 |
| 2020/0273429 | A1* | 8/2020 | Broy | B60Q 3/283 |
| 2020/0275068 | A1* | 8/2020 | Li | H04N 9/3155 |
| 2020/0286447 | A1 | 9/2020 | Hei et al. | |
| 2020/0294469 | A1* | 9/2020 | Kim | G09G 5/00 |
| 2020/0410940 | A1 | 12/2020 | Kim et al. | |
| 2021/0166654 | A1 | 6/2021 | Yu et al. | |
| 2022/0198977 | A1 | 6/2022 | Kim et al. | |
| 2023/0169900 | A1* | 6/2023 | Han | G09G 3/3233 345/206 |
| 2023/0169903 | A1* | 6/2023 | Kim | G09G 3/20 345/207 |
| 2023/0169913 | A1* | 6/2023 | Ryoo | G09G 3/32 |

FOREIGN PATENT DOCUMENTS

| | | | |
|---|---|---|---|
| CN | 110447061 | A | 11/2019 |
| CN | 110808003 | A | 2/2020 |
| CN | 111816112 | A | 10/2020 |
| CN | 111816113 | A | 10/2020 |
| CN | 112150956 | A | 12/2020 |
| CN | 113421510 | A | 9/2021 |
| CN | 113948041 | A | 1/2022 |
| CN | 114120915 | A | 3/2022 |
| CN | 114141213 | A | 3/2022 |
| CN | 114648931 | A | 6/2022 |
| JP | 2006084729 | A | 3/2006 |

* cited by examiner

METHOD, APPARATUS AND DEVICE FOR BRIGHTNESS COMPENSATION OF DISPLAY PANEL

CROSS-REFERENCE TO RELATED APPLICATIONS

The present application is a continuation of International Patent Application No. PCT/CN2022/126254, filed on Oct. 19, 2022, which claims priority to Chinese Patent Application No. 202210956782.0, filed on Aug. 10, 2022 and entitled "DISPLAY PANEL, AND BRIGHTNESS COMPENSATION METHOD, COMPENSATION APPARATUS, AND COMPENSATION DEVICE THEREFOR", which is incorporated herein by reference in its entirety.

TECHNICAL FIELD

The present application relates to the field of display technologies, and in particular, to a brightness compensation method, compensation apparatus, and compensation device of display panel.

BACKGROUND OF THE INVENTION

With the development of display technologies, requirements for the display quality of display panels are increasingly high. However, a middle region and an edge region of an active area of a display panel in the prior art have display brightness variations, leading to display nonuniformity of the display panel and affecting the display quality.

SUMMARY OF THE INVENTION

Embodiments of the present application provides a display panel, and a brightness compensation method, compensation apparatus, and compensation device therefor, which may allow for a more uniform display effect of the display panel.

An embodiment of a first aspect of the embodiments of the present application provides a brightness compensation method for a display panel, where the display panel includes a first active area and a second active area. The brightness compensation method includes:

- obtaining a plurality of actual brightness values of a plurality of sub-pixels in at least one preset region of the display panel at a preset grayscale value, and generating at least one average brightness value;
- determining a target brightness value of the display panel at the preset grayscale value based on the average brightness value;
- determining a plurality of compensation coefficients and a plurality of compensation values of at least some of a plurality of sub-pixels in the second active area based on the target brightness value, and the plurality of actual brightness values of the plurality of sub-pixels in the second active area, where the compensation coefficients are greater than or equal to 0 and less than 1; and
- performing brightness compensation on the sub-pixel in the second active area based on a product of the compensation coefficient and the compensation value.

An embodiment of a second aspect of the present application further provides a display panel, which performs brightness compensation using any one of the brightness compensation methods provided in the first aspect of the present application.

An embodiment of a third aspect of the present application further provides a brightness compensation apparatus for a display panel. The apparatus includes:

- a brightness obtaining module configured to obtain a plurality of actual brightness values of a plurality of sub-pixels in at least one preset region of the display panel at a preset grayscale value;
- an average brightness generation module configured to generate an average brightness value based on the brightness values of the plurality of sub-pixels in the at least one preset region of the display panel at the preset grayscale value;
- a target brightness determination module configured to determine a target brightness value of the display panel at the preset grayscale value based on the average brightness value;
- a compensation value determination module configured to determine a plurality of compensation values of at least some of the plurality of sub-pixels in the second active area based on the target brightness value, and the plurality of actual brightness values of the plurality of sub-pixels in the second active area;
- a compensation coefficient generation module configured to determine a plurality of compensation coefficients of the at least some of the plurality of sub-pixels in the second active area based on the target brightness value, and the plurality of actual brightness values of the plurality of sub-pixels in the second active area, where the compensation coefficients are greater than or equal to 0 and less than 1; and
- a compensation module configured to perform brightness compensation on the sub-pixel in the second active area based on a product of the compensation coefficient and the compensation value.

An embodiment of a fourth aspect of the present application further provides a brightness compensation device for a display panel. The device includes a processor, a memory, and a computer program stored in the memory and executable on the processor, where the computer program, when executed by the processor, causes any one of the brightness compensation methods for a display panel provided in the first aspect of the present application to be implemented.

In the brightness compensation method for a display panel provided in the present application, brightness compensation is performed on the sub-pixel in the second active area based on the product of the compensation coefficient and the compensation value. Since the compensation coefficient is greater than or equal to 0 and less than 1, the compensation coefficient may be used to reduce and weaken the compensation value of the sub-pixel in the second active area, so that the product of the compensation coefficient and the compensation value is less than the compensation value itself. In this way, when compensation is performed on the second active area based on the products of the compensation coefficients and the compensation values, the compensation effect on the sub-pixels of the second active area can be weakened, so that the brightness of the second active area is increased while reducing an amplitude of false compensation for the sub-pixels in the first active area. Therefore, in the compensated display panel, the contrast between the first active area and the second active area is relatively small, and the display panel has a more uniform display effect.

BRIEF DESCRIPTION OF DRAWINGS

In order to describe the technical solutions in the embodiments of the present application more clearly, the drawings required for illustration of the embodiments of the present application will be briefly introduced below. Obviously, the drawings as described below are only for some of the embodiments of the present application, and for those of ordinary skill in the art, other drawings can also be obtained from these drawings without any creative effort.

DETAILED DESCRIPTION OF THE INVENTION

The features and exemplary embodiments of the present application in various aspects will be described in detail below. In the following detailed description, many specific details are set forth to comprehensively understand the present application. However, it will be very apparent to those skilled in the art that the present application may be implemented without some of these specific details. The following description of the embodiments are merely to provide a better understanding for the present application by illustrating examples of the present application.

Herein, relative terms such as "first" and "second" are only used to distinguish one entity or operation from another entity or operation, and do not necessarily require or imply that such an actual relationship or order exists between these entities or operations. Moreover, the terms "include", "comprise", or any other variants thereof are intended to cover a non-exclusive inclusion, so that a process, a method, an article, or a device that includes a list of elements not only includes those elements but also includes other elements that are not listed, or further includes elements inherent to such a process, method, article, or device. If no more limitations are made, an element limited by "comprising/including . . . " does not exclude other identical elements existing in the process, the method, the article, or the device which includes the element.

The inventor has found through research that the cause of display nonuniformity of a display panel lies in the following: A boundary of an organic common layer in an edge region of an active area is thin, resulting in a lower brightness in the edge region during display, and when compensation for this is performed according to a conventional compensation method, the resulting brightness is too high, and a middle region and the edge region of the active area have brightness variations, leading to a nonuniform display effect of the display panel. Based on the research on the above problem, the inventor provides a display panel, and a brightness compensation method, compensation apparatus, and compensation device therefor, so as to make the display brightness of the display panel more uniform, thereby improving the display quality of the display panel.

In order to better understand the present application, a display panel, and a brightness compensation method, compensation apparatus, and compensation device therefor according to the embodiments of the present application will be described below with reference to FIG. 1 to FIG. 11.

Figure 1:
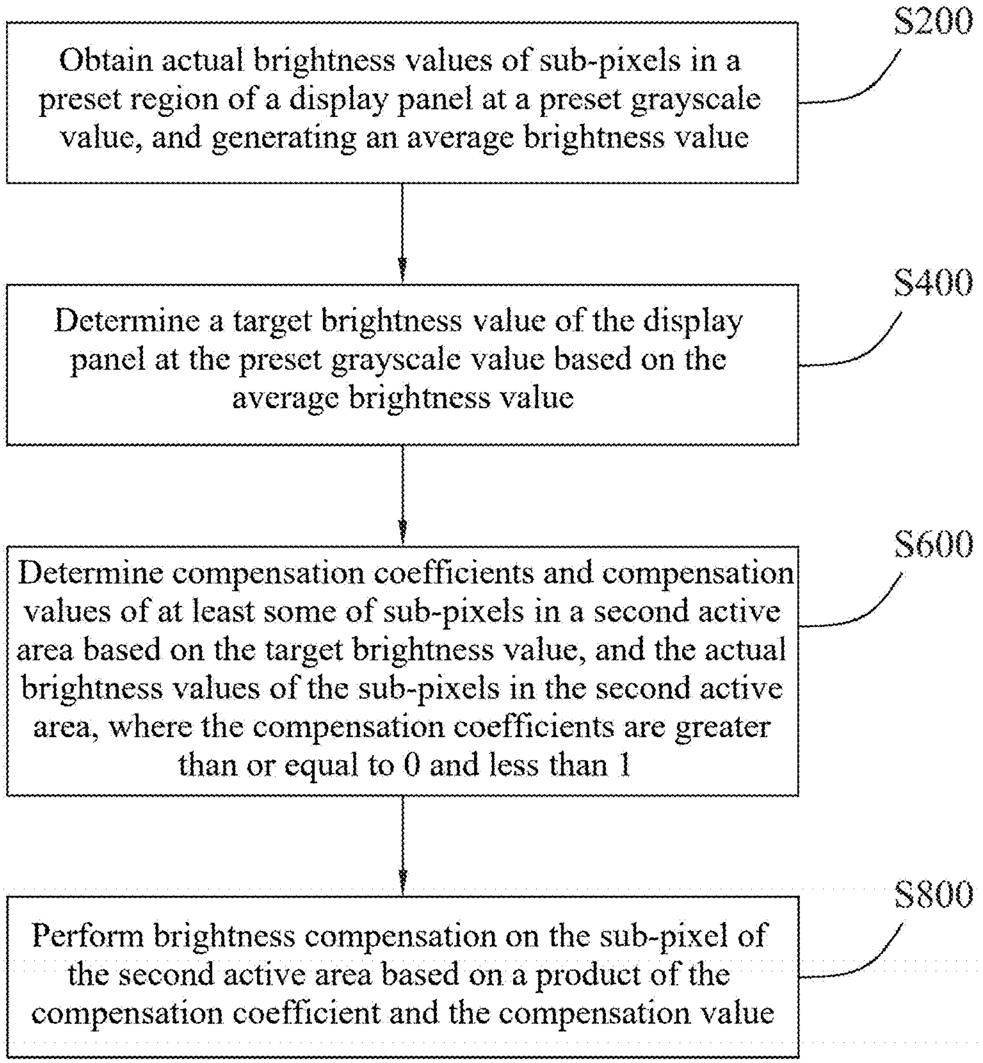
FIG. 1 is a flowchart of a brightness compensation method for a display panel according to an embodiment of the present application.
Figure 2:
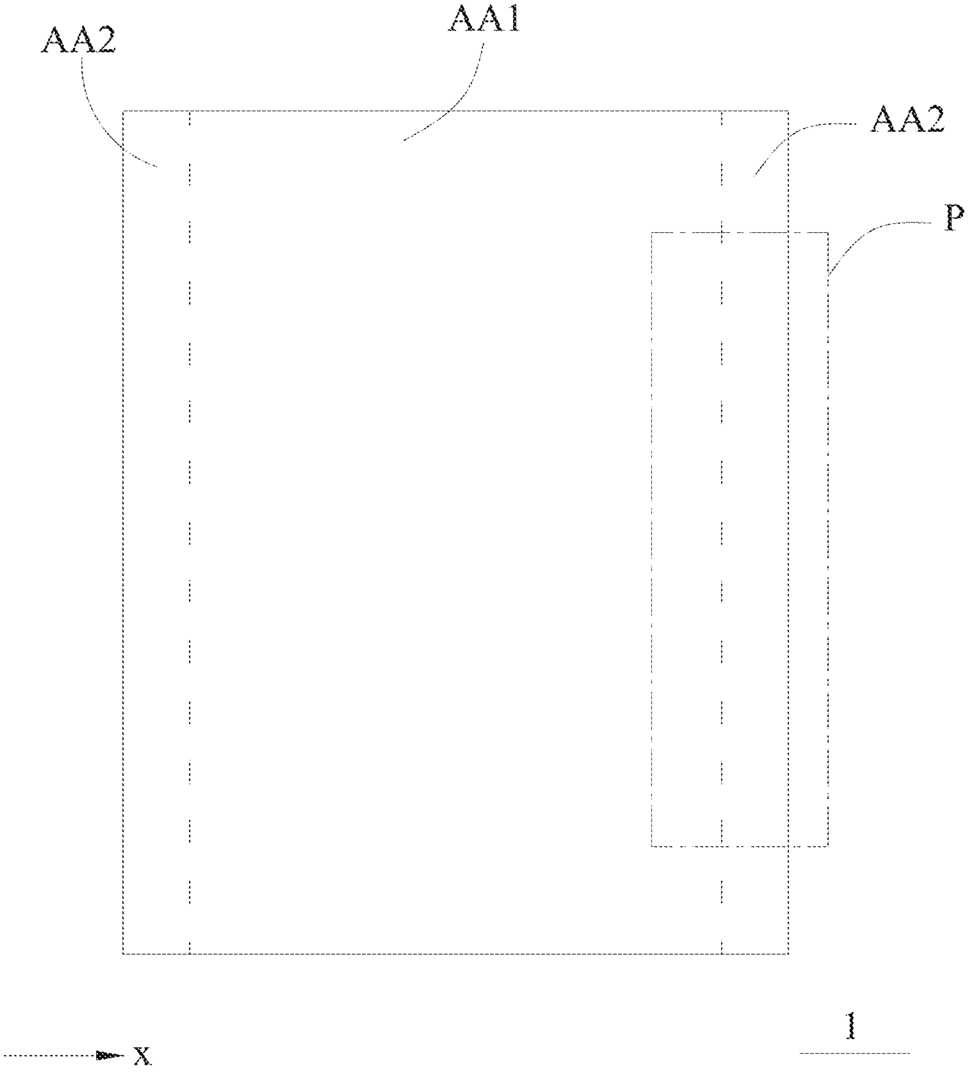
FIG. 2 is a schematic diagram of a structure of a display panel requiring compensation during implementation of a brightness compensation method for a display panel according to an embodiment of the present application.

Referring to FIG. 1 and FIG. 2, an embodiment of the present application provides a brightness compensation method for a display panel. A display panel 1 includes a first active area AA1 and a second active area AA2. The brightness compensation method includes the following steps.

S200: Obtain a plurality of actual brightness values of a plurality of sub-pixels in at least one preset region of the display panel 1 at a preset grayscale value, and generate at least one average brightness value.

The preset region may include the first active area AA1 and the second active area AA2 of the display panel 1, or may be a partial region within the first active area AA1, or may include a partial region within the first active area AA1 and a partial region within the second active area AA2. Specifically, the preset region may include one region or a plurality of regions.

The preset grayscale value may be any grayscale level at which the display panel can display. For example, a grayscale level at which the display panel can display ranges from 0 to 255, and the preset grayscale value may be any value between 0 and 255.

S400: Determine a target brightness value of the display panel 1 at the preset grayscale value based on the average brightness value.

Specifically, when the preset region is one region, the average brightness value of the region may be used as the target brightness value; or when the preset region includes a plurality of regions, an average value of the average brightness values of the regions may be used as the target brightness value.

S600: Determine a plurality of compensation coefficients and a plurality of compensation values of at least some of the plurality of sub-pixels in the second active area AA2 based on the target brightness value, and the plurality of actual brightness values of the plurality of sub-pixels in the second active area AA2, where the compensation coefficients are greater than or equal to 0 and less than 1.

S800: Perform brightness compensation on the sub-pixel of the second active area AA2 based on a product of the compensation coefficient and the compensation value.

Specifically, the compensation value is a difference between the target brightness value, and the actual brightness value of the sub-pixel in the second active area AA2, the compensation coefficient is greater than or equal to 0 and less than 1, and performing brightness compensation on the sub-pixel in the second active area AA2 based on the product of the compensation coefficient and the compensation value means that the brightness compensation is performed on the sub-pixel in the second active area AA2 with the target brightness value as an upper limit for brightness. The compensation coefficient is a coefficient used to adjust the compensation value. Compensation coefficients corresponding to different sub-pixels may be the same or different.

Before brightness compensation is performed on the display panel 1 according to the brightness compensation method described above, the second active area AA2 in the display panel 1 may be an edge region with lower brightness in the display panel 1, and the brightness of the first active area AA1 is higher than that of the second active area AA2. When the brightness compensation is performed on the sub-pixels in the second active area AA2 directly using the compensation values, false compensation for sub-pixels in the first active area AA1 that are adjacent to the second active area AA2 with the compensation values of the sub-pixels in the second active area AA2 easily occurs. Since the sub-pixels in the first active area AA1 have higher brightness than the sub-pixels in the second active area AA2, the false compensation may result in excessively compensated brightness of the sub-pixels in the first active area AA1 that are adjacent to the second active area AA2, which creates a brighter band in a region of the first active area AA1 of the display panel 1 that is close to the second active area AA2. In the brightness compensation method for a display panel provided in the present application, brightness compensation is performed on the sub-pixel in the second active area AA2 based on the product of the compensation coefficient and the compensation value. Since the compensation coefficient is greater than or equal to 0 and less than 1, the compensation coefficient may be used to reduce and weaken the compensation value of the sub-pixel in the second active area AA2, so that the product of the compensation coefficient and the compensation value is less than the compensation value itself. In this way, when compensation is performed on the second active area AA2 based on the products of the compensation coefficients and the compensation values, the compensation effect on the sub-pixels of the second active area AA2 can be weakened, so that the brightness of the second active area AA2 is increased while reducing an amplitude of false compensation for the sub-pixels in the first active area AA1. Therefore, in the compensated display panel 1, the contrast between the first active area AA1 and the second active area AA2 is relatively small, and the display panel 1 has a more uniform display effect.

Figure 3:
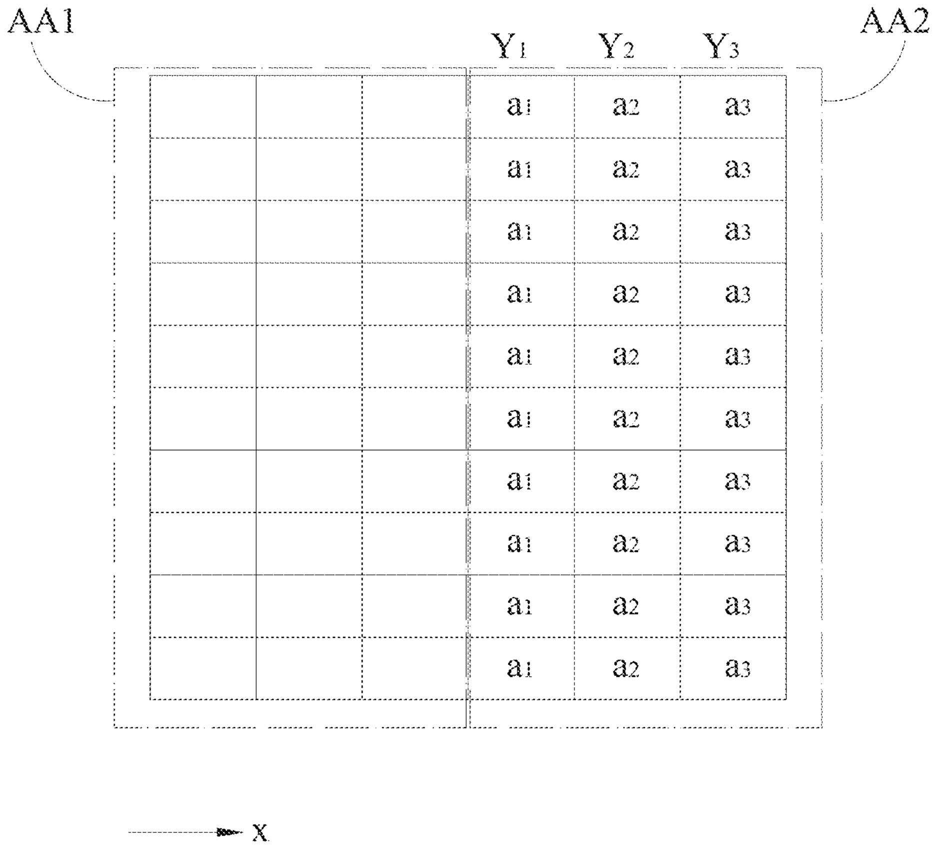
FIG. 3 is a schematic partial view of a P region in FIG. 2.

In a feasible implementation, as shown in FIG. 3, the first active area AA1 and the second active area AA2 are arranged in a row direction x, a plurality of columns of sub-pixels in the second active area AA2 are arranged side by side in the row direction x, the compensation coefficients corresponding to the sub-pixels in a same column are the same, and the compensation coefficients corresponding to the plurality of columns of sub-pixels decrease in a direction away from the first active area AA1.

Specifically, the second active area AA2 includes columns of sub-pixels, $Y_1, \ldots, Y_j, \ldots, Y_N$, arranged in the row direction x, where $1 \le j \le N$, and N is a positive integer greater than 1. When N is equal to 3, as shown in FIG. 3, the second active area AA2 includes columns of sub-pixels, $Y_1$, $Y_2$, $Y_3$, in the row direction x, a compensation coefficient corresponding to the column of sub-pixels $Y_1$ is $\alpha_1$, a compensation coefficient corresponding to the column of sub-pixels $Y_2$ is $\alpha_2$, and a compensation coefficient corresponding to the column of sub-pixels $Y_3$ is $\alpha_3$, where $\alpha_1 > \alpha_2 > \alpha_3$.

In the above implementation, each column of sub-pixels within the second active area AA2 corresponds to a same compensation coefficient, and the compensation coefficients corresponding to the columns of sub-pixels gradually decrease in a direction away from the first active area AA1. Therefore, the regulation function of the compensation coefficients on the compensation values of the second active area AA2 gradually changes in the direction away from the first active area AA1, so that the brightness compensation effect on the sub-pixels in the second active area AA2 tends to gradually weaken in the direction away from the first active area AA1. As such, the contrast ratio of the display panel 1 is reduced.

In a feasible implementation, in the direction away from the first active area AA1, the compensation coefficients corresponding to the plurality of columns of sub-pixels in the second active area AA2 lie on a same straight line or a same parabola.

In the above implementation, in the direction away from the first active area AA1, the compensation coefficients decreases linearly or in a curvilinear form. When the compensation coefficients decrease linearly, for example, $\alpha_1$ may be 1, $\alpha_2$ may be 0.5, and $\alpha_3$ may be 0, the compensation coefficients of the columns may decrease with equal gradients, so that the compensation effect on the columns of sub-pixels tends to gradually attenuate. When the compensation coefficients decrease in a curvilinear form, the compensation coefficients of the columns may decrease at a speed from fast to slow or from slow to fast, along the direction away from the first active area AA1, so that the compensation effect on the columns of sub-pixels tends to gradually attenuate. Therefore, the contrast ratio of the display panel 1 is gradually reduced, and the brightness becomes uniform.

A brightness compensation method for the first active area AA1 is as follows. First, the actual brightness values of the sub-pixels in the preset region of the display panel 1 at the preset grayscale value are obtained, and the average brightness value is generated. The preset region may include the first active area AA1 and the second active area AA2 of the display panel 1, or may be a partial region within the first active area AA1, or may include a partial region within the first active area AA1 and a partial region within the second active area AA2. Specifically, the preset region may include one region or a plurality of regions.

Then, the target brightness value of the display panel 1 at the preset grayscale value is determined based on the average brightness value. Specifically, when the preset region is one region, the average brightness value of the region may be used as the target brightness value; or when the preset region includes a plurality of regions, an average value of the average brightness values of the regions may be used as the target brightness value.

Then, compensation values of at least some of sub-pixels in the first active area AA1 are determined based on the target brightness value, and actual brightness values of the sub-pixels in the first active area AA1. The compensation values of the first active area AA1 are differences between the target brightness value, and the actual brightness values of the sub-pixels in the first active area AA1.

Finally, brightness compensation is performed on the sub-pixels of the first active area AA1 based on the compensation values.

Figure 4:
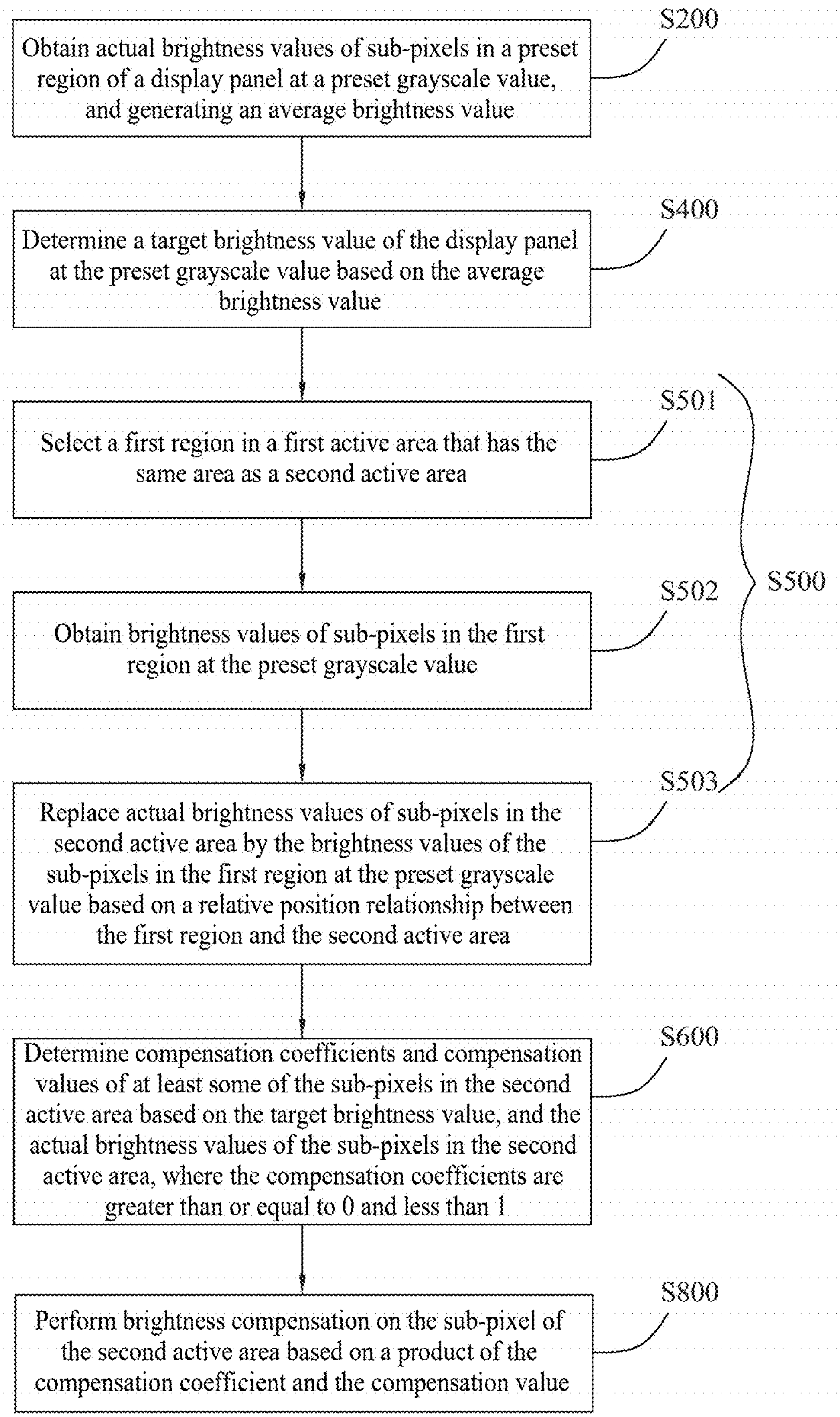
FIG. 4 is a flowchart of another brightness compensation method for a display panel according to an embodiment of the present application.

In a feasible implementation, as shown in FIG. 4, before step S600, the compensation method further includes step S500. S500 includes:

S501: Select in the first active area AA1 a first region A1 that has the same area as the second active area AA2.

S502: Obtain brightness values of sub-pixels in the first region A1 at the preset grayscale value.

S503: Replace actual brightness values of the sub-pixels in the second active area AA2 by the brightness values of the sub-pixels in the first region A1 at the preset grayscale value based on a relative position relationship between the first region A1 and the second active area AA2.

In the above implementation, before compensation, data replacement is performed on the actual brightness values of the second active area AA2. Specifically, the first region A1 that has the same area as the second active area AA2 is first selected in the first active area AA1, then, the brightness values of the sub-pixels in the first region A1 at the preset grayscale value are obtained, and then, the actual brightness values of the sub-pixels in the second active area AA2 are replaced by the brightness values of the first region A1. Since the second active area AA2 is darker than the first active area AA1 before compensation, the actual brightness values of the sub-pixels in the second active area AA2 are lower, so that a higher level of compensation is required (i.e., the compensation value obtained through calculation according to step S600 is larger in this case). In this case, it is easy to cause over-compensation for some of the sub-pixels in the first active area AA1 that are adjacent to the second active area AA2, which creates a brighter band. After the actual brightness values of the sub-pixels in the second active area AA2 are replaced by the brightness values of the sub-pixels in the first region A1, since the brightness values of the sub-pixels in the first region A1 are higher, less compensation is required (i.e., the compensation value obtained through calculation according to step S600 is smaller in this case). When step S600 of determining compensation coefficients and compensation values of at least some of the sub-pixels in the second active area AA2 based on the target brightness value, and the actual brightness values of the sub-pixels in the second active area AA2 is performed, since the compensation value is the difference between the target brightness value, and the actual brightness value of the sub-pixel in the second active area AA2, and in this case, the actual brightness values of the sub-pixels in the second active area AA2 are replaced by the brightness values of the sub-pixels in the first region A1, that is, replaced by larger values, the compensation value determined after step S500 is added is smaller, thereby weakening the compensation for the second active area AA2, and reducing an amplitude of over-compensation for the adjacent part of first active area AA1. The above implementation helps to reduce a contrast between adjacent positions of the first active area AA1 and the second active area AA2, thereby helping to improve the display uniformity of the display panel 1.

Figure 5:
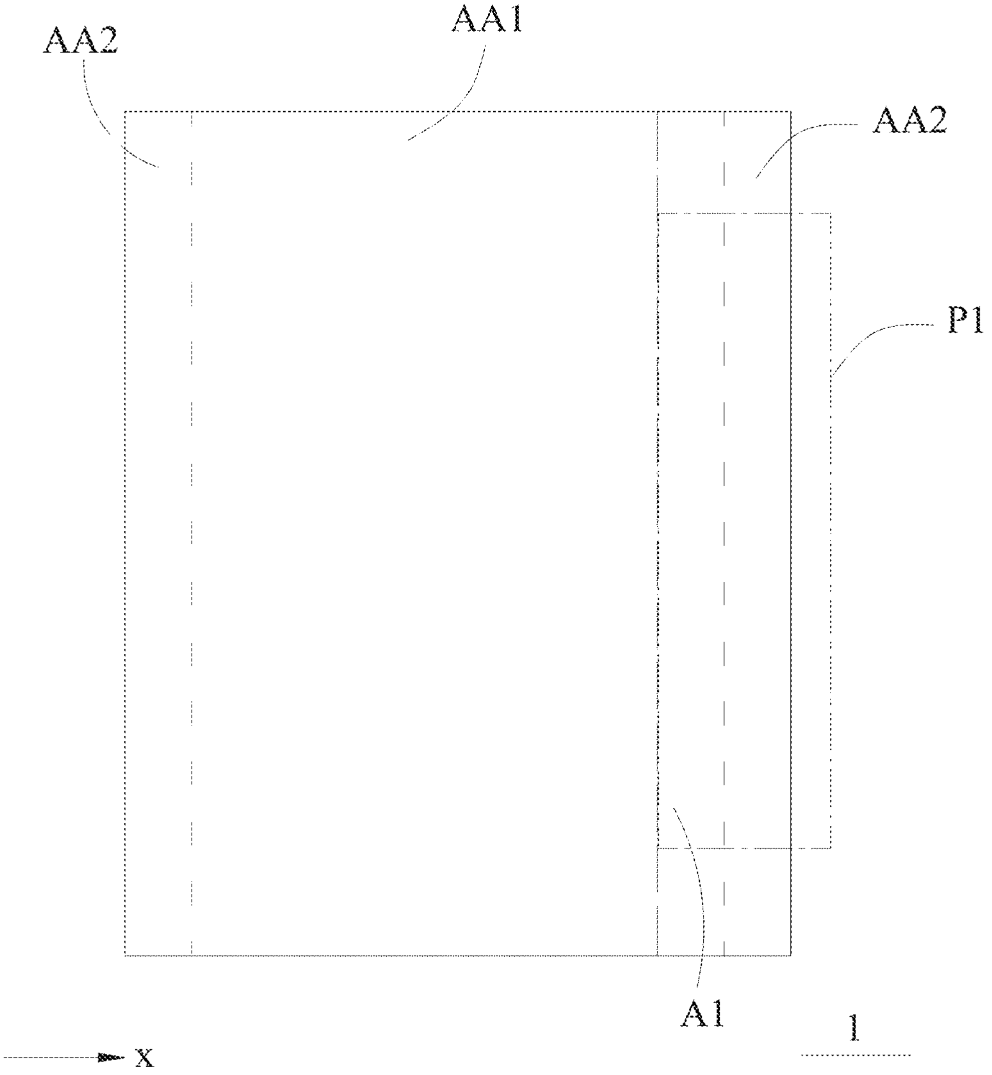
FIG. 5 is a schematic diagram of a structure of a display panel requiring compensation during implementation of another brightness compensation method for a display panel according to an embodiment of the present application.
Figure 6:
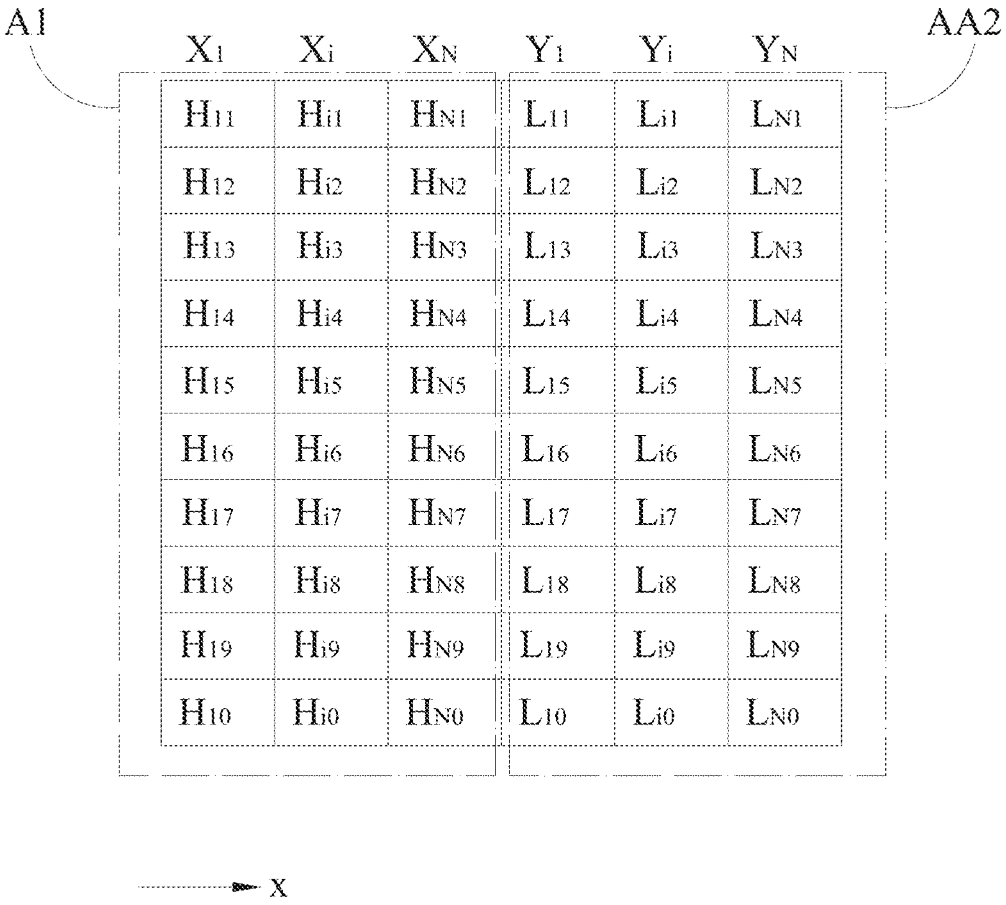
FIG. 6 is a schematic partial view of a P1 region in FIG. 5.

As shown in FIG. 5 and FIG. 6, the first region A1 may be a region adjacent to the second active area AA2. The selection of the first region A1 adjacent to the second active area AA2 may result in a small difference in the second active area AA2 before and after replacement, thereby obtaining a small difference between the compensation values calculated for the second active area AA2 and the compensation values for the first active area AA1 adjacent to the second active area AA2. Therefore, when brightness compensation is performed on the second active area AA2, even if the first active area AA1 is affected, the effect is small due to the small difference between the compensation values of the first active area AA1 and the second active area AA2. Accordingly, the effect of subsequent compensation on this basis is improved.

Figure 7:
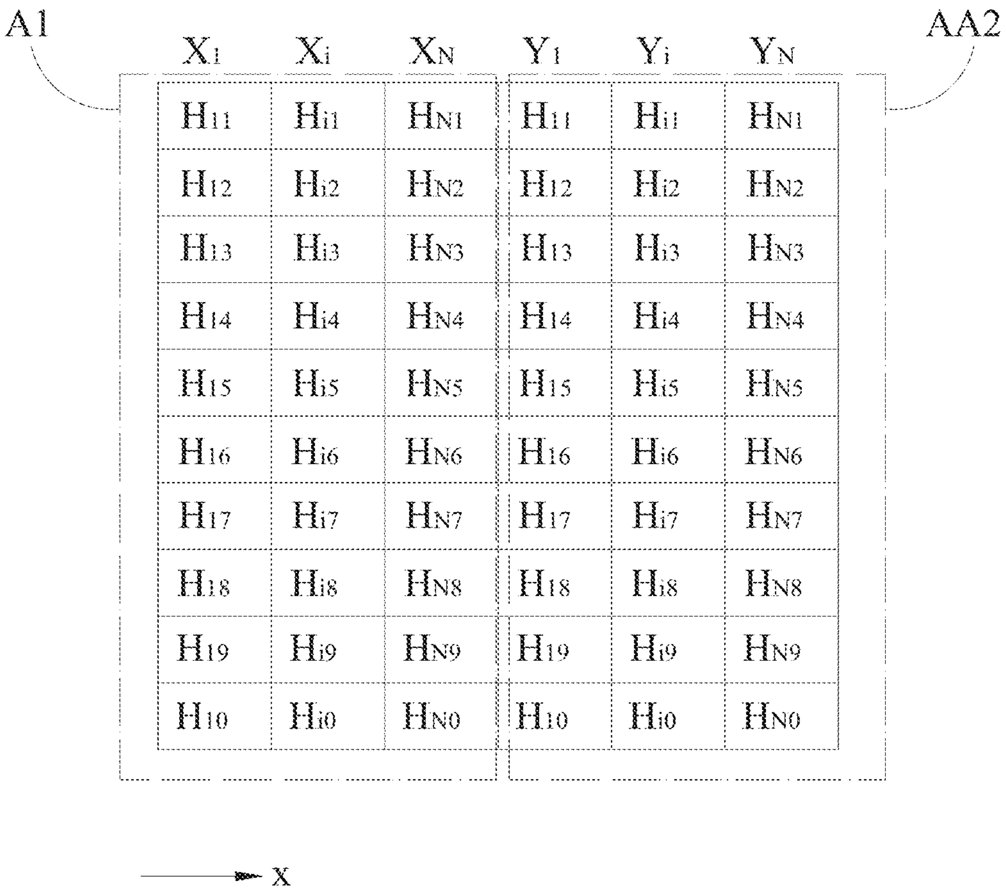
FIG. 7 is a schematic diagram of a structure for a data replacement process during implementation of a brightness compensation method for a display panel according to an embodiment of the present application.

In a feasible implementation, as shown in FIG. 6 and FIG. 7, step S503 includes:

S5031: Make a translational copy of the brightness values of the sub-pixels in the first region A1 at the preset grayscale value to the second active area AA2.

Specifically, the sub-pixels in the first region A1 and the second active area AA2 are arranged in rows and columns, the first region A1 includes columns of sub-pixels, $X_1, \ldots, X_i \ldots$, and $X_N$, arranged in a row direction x, where $1 \le i \le N$, and the second active area AA2 includes columns of sub-pixels, $Y_1, \ldots, Y_j, \ldots, Y_N$, arranged in the row direction x, where $1 \le j \le N$, and N is a positive integer greater than 1, where brightness values of the sub-pixels in the column $Y_k$ at the preset grayscale value are replaced by brightness values of the sub-pixels in the column $X_k$ at the preset grayscale value, where $1 \le k < N$.

In the above implementation, a translational copy of the brightness values of the sub-pixels in the first region A1 at the preset grayscale value is made to the second active area AA2, to perform data replacement on the actual brightness values of the second active area AA2 at the preset grayscale value. In this implementation, the data replacement is implemented by means of translational replacement, which is a simple and can effectively weaken the compensation for the second active area AA2, and thus, reduce the effect on the adjacent part of the first active area AA1 during compensation for the second active area AA2, thereby preventing a sudden change in brightness of part of the first active area adjacent to the second active area AA2 while helping to reduce the contrast between the second active area AA2 and the adjacent part of first active area AA1.

Figure 8:
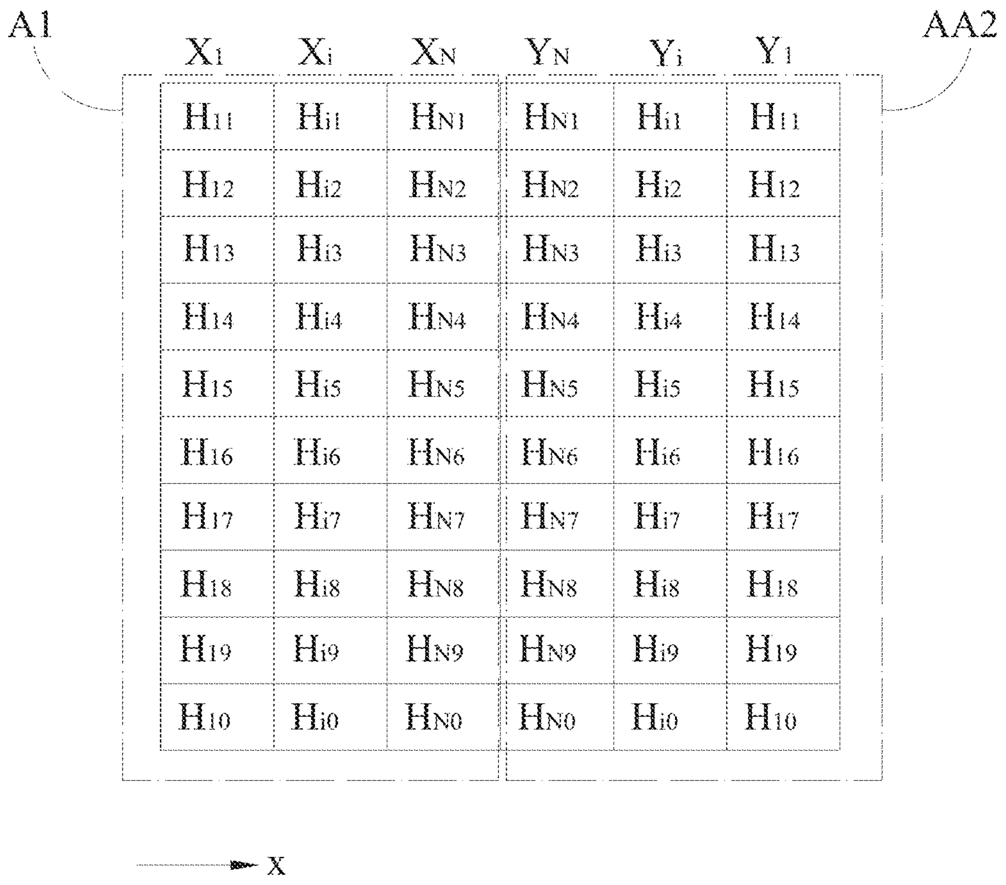
FIG. 8 is a schematic diagram of a structure for another data replacement process during implementation of a brightness compensation method for a display panel according to an embodiment of the present application.

In another feasible implementation, as shown in FIG. 6 and FIG. 8, step S503 includes:

In S5032, the sub-pixels in the first region A1 and the second active area AA2 are arranged in rows and columns, the first region A1 includes the columns of sub-pixels, $X_1, \ldots, X_i \ldots$, and $X_N$, arranged in the row direction x, where $1 \le i \le N$, and the second active area AA2 includes columns of sub-pixels, $Y_1, \ldots, Y_j, \ldots$, and $Y_N$. arranged in the row direction x, where $1 \le j \le N$, and N is a positive integer greater than 1, where brightness values of the sub-pixels in the column $Y_{N-k}$ at the preset grayscale value are replaced by brightness values of the sub-pixels in the column $X_k$ at the preset grayscale value, where $1 \le k < N$.

In the above implementation, a mirror copy of the brightness values of the sub-pixels in the first region A1 at the preset grayscale value is made about an axis perpendicular to the row direction x to the second active area AA2, to perform data replacement on the actual brightness values of the second active area AA2 at the preset grayscale value. In this implementation, the data replacement is implemented by means of mirror replacement, which can further reduce the difference in values at adjacent positions of the first active area AA1 and the second active area AA2 after replacement, so that a difference between compensation amplitudes of sub-pixels at the adjacent positions of the first active area AA1 and the second active area AA2 is reduced, and thus, the effect on the first active area AA1 during compensation for the second active area AA2 is reduced, thereby reducing the contrast between the second active area AA2 and the adjacent part of first active area AA1.

Figure 9:
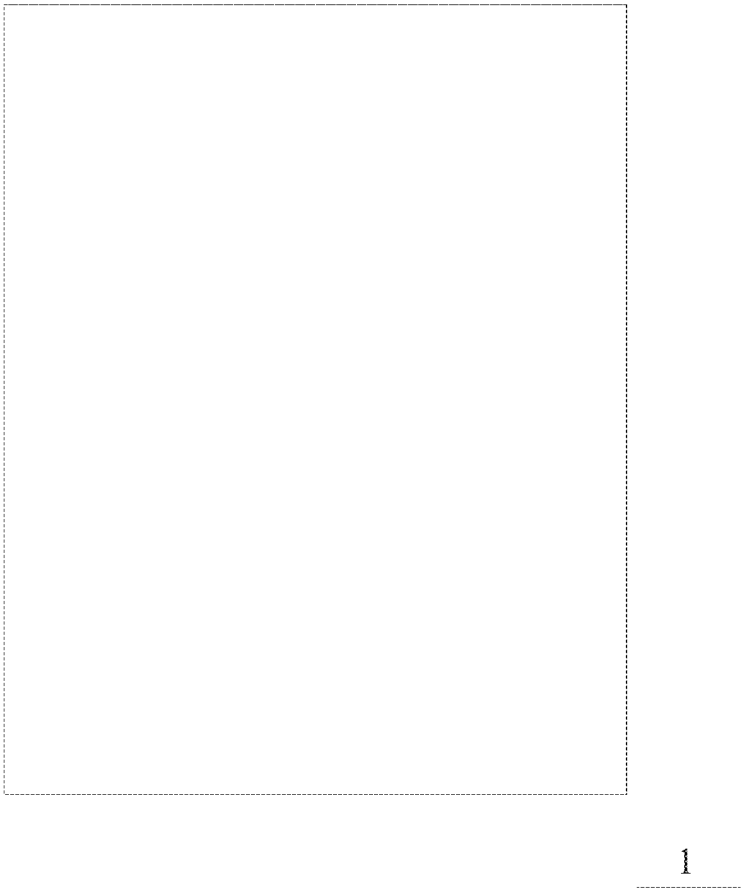
FIG. 9 is a schematic diagram of a structure of a display panel according to an embodiment of the present application.

As shown in FIG. 9, the present application further provides a display panel 1. The display panel 1 performs brightness compensation using any one of the brightness compensation methods for a display panel provided in the above implementations.

The display panel 1 has its display brightness more uniform, and has a low probability of sudden change in brightness occurring at a position of a first active area AA1 close to a second active area AA2, so that display quality is significantly improved.

Figure 10:
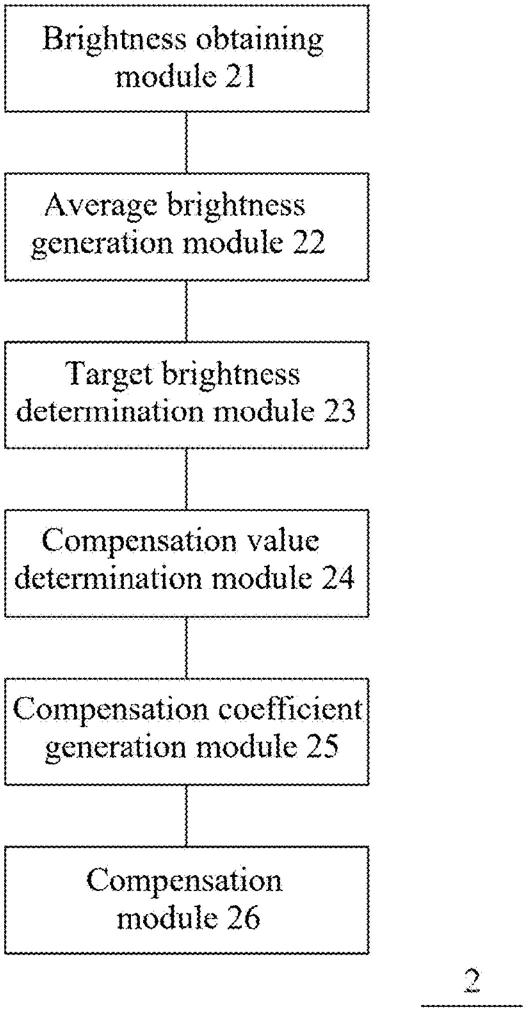
FIG. 10 is a schematic diagram of a structure of a brightness compensation apparatus for a display panel according to an embodiment of the present application.

The present application further provides a brightness compensation apparatus 2 for a display panel. As shown in FIG. 10, the apparatus includes the following modules.

A brightness obtaining module 21 is configured to obtain a plurality of actual brightness values of a plurality of sub-pixels in at least one preset region of a display panel 1 at a preset grayscale value. The brightness obtaining module 21 may include an image acquisition device. The preset region may include a first active area AA1 and a second active area AA2 of the display panel 1, or may be a partial region within the first active area AA1, or may be partial regions within the first active area AA1 and the second active area AA2. Specifically, the preset region may include one region or a plurality of regions.

Specifically, after the display panel 1 requiring compensation is turned on, the image acquisition device may be used to photograph the display panel 1 requiring compensation, so as to acquire brightness data of the preset region of the display panel 1 requiring compensation and generate a comma-separated values (CSV) file. The image acquisition device may be a high-resolution and high-precision camera, for example, a charge coupled device (CCD) camera. The first active area AA1 and the second active area AA2 of the display panel 1 requiring compensation may be photographed simultaneously to obtain overall data, and then actual brightness values of sub-pixels in each preset region at the target grayscale value may be selected from the overall data. Alternatively, a partial display region of the display panel 1 requiring compensation may be photographed, that is, the photographed region may include only the preset region, which is not limited here.

An average brightness generation module 22 is configured to generate an average brightness value based on the brightness values of the plurality of sub-pixels in the at least one preset region of the display panel 1 at the preset grayscale value.

Specifically, the average brightness generation module 22 generates the average brightness value based on the brightness data of the preset region obtained by the brightness obtaining module 21, and a total number of the sub-pixels in the preset region. When the preset region is one region, the average brightness value of the region may be directly generated. When the preset region includes a plurality of regions, the average brightness value of each region may be generated separately.

A target brightness determination module 23 is configured to determine a target brightness value of the display panel 1 at the preset grayscale value based on the average brightness value.

When the preset region is one region, the average brightness value of the region, which is generated by the average brightness generation module 22 is the target brightness value. When the preset region includes a plurality of regions, an average of the average brightness values of the regions is the target brightness value.

A compensation value determination module 24 is configured to determine a plurality of compensation values of at least some of the plurality of sub-pixels in the second active area AA2 based on the target brightness value and the plurality of actual brightness values of the plurality of sub-pixels in the second active area AA2.

Specifically, the actual brightness values of the sub-pixels in the second active area AA2 may be obtained by the brightness obtaining module 21. The compensation value determination module 24 generates the compensation values of at least some of the sub-pixels in the second active area AA2 based on the target brightness value determined by the target brightness determination module 23, and the actual brightness values of the pixels in the second active area AA2 obtained by the brightness obtaining module 21. The compensation value is a difference between the target brightness value and the actual brightness value.

A compensation coefficient generation module 25 is configured to determine a plurality of compensation coefficients of the at least some of the plurality of sub-pixels in the second active area AA2 based on the target brightness value, and the plurality of actual brightness values of the plurality of sub-pixels in the second active area AA2, where the compensation coefficients are greater than or equal to 0 and less than 1.

Specifically, compensation coefficients corresponding to the sub-pixels in a same column may be the same, and compensation coefficients of columns of the sub-pixels determined in a direction away from the first active area AA1 may be gradually decreased.

A compensation module 26 is configured to perform brightness compensation on the sub-pixel of the second active area AA2 based on a product of the compensation coefficient and the compensation value.

The brightness compensation apparatus 2 for a display panel provided in the present application weakens the compensation effect on the second active area AA2, thereby preventing over-compensation for some of the sub-pixels in the first active area AA1 that are close to the second active area AA2. Therefore, the over-compensation at the position of the first active area AA1 that is close to the second active area AA2 in the compensated display panel 1 is mitigated, and the uniformity of the display brightness of the display panel 1 is improved.

Figure 11:
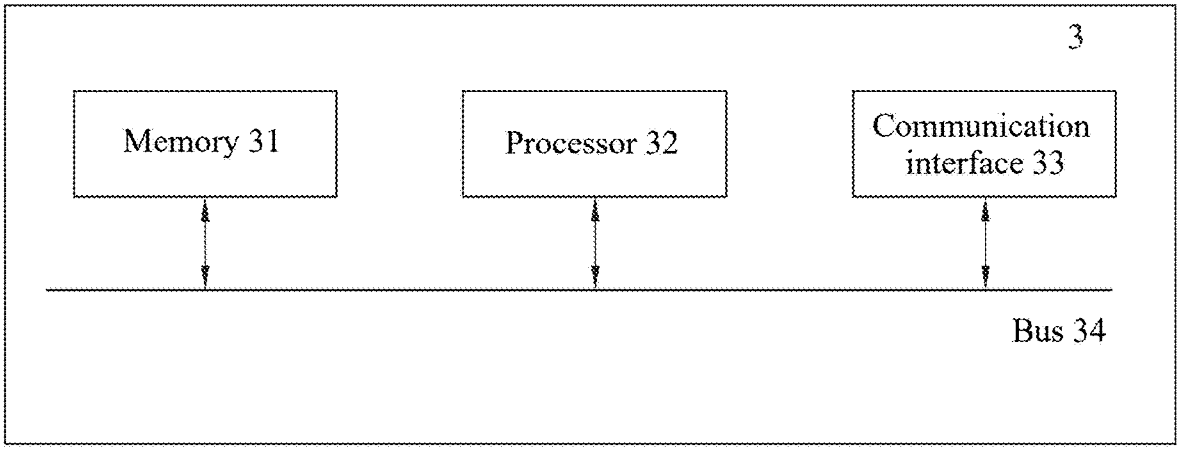
FIG. 11 is a schematic diagram of a structure of a brightness compensation device for a display panel according to an embodiment of the present application.

The present application further provides a brightness compensation device 3 for a display panel. As shown in FIG. 11, the device includes a processor 31, a memory 32, and a computer program stored in the memory 32 and executable on the processor 31. The computer program, when executed by the processor 31, causes any one of the brightness compensation methods for a display panel provided in the present application to be implemented.

In an example, the processor 31 may include a central processing unit 31 (CPU), or an application-specific integrated circuit (ASIC), or one or more integrated circuits that may be configured to implement the embodiments of the present application.

The memory 32 may include a mass memory 32 for data or instructions. As an example, rather than a limitation, the memory 32 may include an HDD, a floppy disk drive, a flash memory, an optical disc, a magneto-optical disc, a magnetic tape, a universal serial bus 34 (USB) drive, or a combination of two or more thereof. When appropriate, the memory 32 may include a removable or non-removable (or fixed) medium. When appropriate, the memory 32 may be located inside or outside a brightness correction device with a terminal hotspot enabled. In a particular embodiment, the memory 32 is a non-volatile solid-state memory 32. In a particular embodiment, the memory 32 includes a read-only memory 32 (ROM). When appropriate, the ROM may be a mask programmed ROM, a programmable ROM (PROM), an erasable PROM (EPROM), an electrically erasable PROM (EEPROM), an electrically alterable ROM (EAROM), a flash memory, or a combination of two or more thereof.

The processor 31 runs a computer program corresponding to an executable program code by reading the executable program code stored in the memory 32, so as to implement the brightness correction method in the above embodiments.

In an example, the brightness compensation device 3 may further include a communication interface 33 and the bus 34. The memory 32, the processor 31, and the communication interface 33 are connected and communicate with each other through the bus 34.

The communication interface 33 is mainly configured to implement communication between the modules, apparatuses, units, and/or devices in the embodiments of the present application. The communication interface 33 may further be configured to connect an input device and/or an output device.

The bus 34 includes hardware, software, or both, and couples components of the brightness correction device to each other. As an example rather than a limitation, the bus 34 may include an Accelerated Graphics Port (AGP) or other graphics buses 34, an Extended Industry Standard Architecture (EISA) bus 34, a front-side bus 34 (FSB), a HyperTransport (HT) interconnect bus, an Industry Standard Architecture (ISA) bus 34, an InfiniBand interconnect bus, a low pin count (LPC) bus 34, a memory 32 bus 34, a Micro Channel architecture (MCA) bus 34, a Peripheral Component Interconnect (PCI) bus 34, a PCI-Express (PCI-X) bus 34, a Serial Advanced Technology Attachment (SATA) bus 34, a Video Electronics Standards Association Local Bus (VLB) 34 or other suitable buses 34, or a combination of two or more thereof. When appropriate, the bus 34 may include one or more buses 34. Although specific buses 34 are described and illustrated in this embodiment of the present application, any suitable bus 34 or interconnect is contemplated in the present application.

The embodiments of the present application further provide a computer-readable storage medium having a computer program stored thereon. The computer program, when executed by the processor 31, causes the brightness compensation method for a display panel as described in the above embodiments to be implemented, and can achieve the same technical effects. To avoid repetition, details are not described herein again. The computer-readable storage medium may include a read-only memory 32 (ROM), a random access memory 32 (RAM), a magnetic disk, an optical disc, or the like, which is not limited here.

The above embodiments of the present application do not set forth all the details, nor do they limit the present invention to the specific embodiments. Obviously, many modifications and variations can be made in light of the above description. The embodiments are selected and described in this specification to better explain the principles and practical applications of the present application, so that those skilled in the art can make good use of the present application and modify and use the present application. The present application is limited only by the claims and all the scopes and equivalents thereof.

What is claimed is:

1. A brightness compensation method for a display panel, wherein the display panel comprises a first active area and a second active area, the brightness compensation method comprising:

obtaining a plurality of actual brightness values of a plurality of sub-pixels in at least one preset region of the display panel at a preset grayscale value, and generating at least one average brightness value;

determining a target brightness value of the display panel at the preset grayscale value based on the average brightness value;

determining a plurality of compensation coefficients and a plurality of compensation values of at least some of the plurality of sub-pixels in the second active area based on the target brightness value, and the plurality of actual brightness values of the plurality of sub-pixels in the second active area, wherein the compensation coefficients are greater than or equal to 0 and less than 1; and performing brightness compensation on the sub-pixel in the second active area based on a product of the compensation coefficient and the compensation value, wherein before the step of determining a plurality of compensation coefficients and a plurality of compensation values of at least some of the plurality of sub-pixels in the second active area based on the target brightness value, and the plurality of actual brightness values of the plurality of sub-pixels in the second active area, wherein the compensation coefficients are greater than or equal to 0 and less than 1, the compensation method further comprises:

selecting from the first active area a first region that has the same area as the second active area;

obtaining brightness values of the sub-pixels in the first region at the preset grayscale value; and replacing the actual brightness values of the sub-pixels in the second active area by the brightness values of the sub-pixels in the first region at the preset grayscale value based on a relative positional relationship between the first region and the second active area, wherein the first region is adjacent to the second active area.

2. The brightness compensation method according to claim 1, wherein the at least one preset region comprises the first active area and the second active area.

3. The brightness compensation method according to claim 1, wherein the at least one preset region is a partial region within the first active area.

4. The brightness compensation method according to claim 1, wherein the at least one preset region comprises a partial region within the first active area and a partial region within the second active area.

5. The brightness compensation method according to claim 1, wherein the at least one preset region is one region, and the average brightness value of the one region is the target brightness value.

6. The brightness compensation method according to claim 1, wherein the at least one preset region comprises a plurality of regions, and an average value of the average brightness values of the plurality of regions is the target brightness value.

7. The brightness compensation method according to claim 1, wherein the compensation value is a difference between the target brightness value, and the actual brightness value of the sub-pixel in the second active area.

8. The brightness compensation method according to claim 1, wherein the first active area and the second active area are arranged in a row direction, a plurality of columns of sub-pixels in the second active area are arranged side by side in the row direction, the compensation coefficients corresponding to the sub-pixels in a same column are the same.

9. The brightness compensation method according to claim 8, wherein the compensation coefficients corresponding to the plurality of columns of sub-pixels decrease in a direction away from the first active area.

10. The brightness compensation method according to claim 9, wherein in the direction away from the first active area, the compensation coefficients corresponding to the plurality of columns of sub-pixels in the second active area lie on a same straight line.

11. The brightness compensation method according to claim 9, wherein in the direction away from the first active area, the compensation coefficients corresponding to the plurality of columns of sub-pixels in the second active area lie on a same parabola.

12. The brightness compensation method according to claim 11, wherein in the direction away from the first active area, the compensation coefficients corresponding to the plurality of the columns of sub-pixels decrease at a speed from fast to slow or from slow to fast.

13. The brightness compensation method according to claim 1, wherein the step of replacing the brightness values of the sub-pixels in the second active area by the brightness values of the sub-pixels in the first region at the preset grayscale value based on a relative positional relationship between the first region and the second active area comprises:

making a translational copy of the brightness values of the sub-pixels in the first region at the preset grayscale value to the second active area.

14. The brightness compensation method according to claim 13, wherein the step of making a translational copy of the brightness values of the sub-pixels in the first region at the preset grayscale value to the second active area comprises:

the sub-pixels in the first region and the second active area are arranged in rows and columns, the first region comprises columns of sub-pixels, $X_1, \ldots, X_i, \ldots, X_N$, arranged in a row direction x, wherein $1 \leq i \leq N$, and the second active area comprises columns of sub-pixels, $Y_1, \ldots, Y_j, \ldots, Y_N$, arranged in the row direction x, wherein $1 \leq j \leq N$, and N is a positive integer greater than 1; and wherein brightness values of the sub-pixels in the column $Y_k$ at the preset grayscale value are replaced by brightness values of the sub-pixels in the column $X_k$ at the preset grayscale value, wherein $1 \leq k < N$.

15. The brightness compensation method according to claim 1, wherein the step of replacing the brightness values of the sub-pixels in the second active area by the brightness values of the sub-pixels in the first region at the preset grayscale value based on a relative positional relationship between the first region and the second active area comprises:

the sub-pixels in the first region and the second active area are arranged in rows and columns, the first region comprises columns of sub-pixels, $X_1, \ldots, X_i, \ldots, X_N$, arranged in the row direction, wherein $1 \leq i \leq N$, and the second active area comprises columns of sub-pixels, $Y_1, \ldots, Y_j, \ldots, Y_N$, arranged in the row direction, wherein $1 \leq j \leq N$, and N is a positive integer greater than 1; and wherein brightness values of the sub-pixels in the column $Y_{N-k}$ at the preset grayscale value are replaced by brightness values of the sub-pixels in the column $X_k$ at the preset grayscale value, wherein $1 \leq k < N$.

16. The brightness compensation method according to claim 1, wherein the preset grayscale value is any value between 0 and 255.

17. A brightness compensation apparatus for a display panel, the apparatus comprising:

a brightness obtaining module configured to obtain a plurality of actual brightness values of a plurality of sub-pixels in at least one preset region of the display panel at a preset grayscale value;

an average brightness generation module configured to generate an average brightness value based on the brightness values of the plurality of sub-pixels in the at least one preset region of the display panel at the preset grayscale value;

a target brightness determination module configured to determine a target brightness value of the display panel at the preset grayscale value based on the average brightness value;

a compensation value determination module configured to determine a plurality of compensation values of at least some of the plurality of sub-pixels in the second active area based on the target brightness value, and the plurality of actual brightness values of the plurality of sub-pixels in the second active area;

a compensation coefficient generation module configured to determine a plurality of compensation coefficients of the at least some of the plurality of sub-pixels in the second active area based on the target brightness value, and the plurality of actual brightness values of the plurality of sub-pixels in the second active area, wherein the compensation coefficients are greater than or equal to 0 and less than 1; and a compensation module configured to perform brightness compensation on the sub-pixel in the second active area based on a product of the compensation coefficient and the compensation value, wherein before the step of determining a plurality of compensation coefficients and a plurality of compensation values of at least some of the plurality of sub-pixels in the second active area based on the target brightness value, and the plurality of actual brightness values of the plurality of sub-pixels in the second active area, wherein the compensation coefficients are greater than or equal to 0 and less than 1, the compensation method further comprises:

selecting from the first active area a first region that has the same area as the second active area;

obtaining brightness values of the sub-pixels in the first region at the preset grayscale value; and replacing the actual brightness values of the sub-pixels in the second active area by the brightness values of the sub-pixels in the first region at the preset grayscale value based on a relative positional relationship between the first region and the second active area, wherein the first region is adjacent to the second active area.

18. A brightness compensation device for a display panel, the device comprising a processor, a memory, and a computer program stored in the memory and executable on the processor, wherein the computer program, when executed by the processor, causes the brightness compensation method for a display panel according to claim 1 comprises a first active area and a second active area, the brightness compensation method comprising:

obtaining a plurality of actual brightness values of a plurality of sub-pixels in at least one preset region of the display panel at a preset grayscale value, and generating at least one average brightness value;

determining a target brightness value of the display panel at the preset grayscale value based on the average brightness value;

determining a plurality of compensation coefficients and a plurality of compensation values of at least some of the plurality of sub-pixels in the second active area based on the target brightness value, and the plurality of actual brightness values of the plurality of sub-pixels in the second active area, wherein the compensation coefficients are greater than or equal to 0 and less than 1; and performing brightness compensation on the sub-pixel in the second active area based on a product of the compensation coefficient and the compensation value, wherein before the step of determining a plurality of compensation coefficients and a plurality of compensation values of at least some of the plurality of sub-pixels in the second active area based on the target brightness value, and the plurality of actual brightness values of the plurality of sub-pixels in the second active area, wherein the compensation coefficients are greater than or equal to 0 and less than 1, the compensation method further comprises:

selecting from the first active area a first region that has the same area as the second active area;

obtaining brightness values of the sub-pixels in the first region at the preset grayscale value; and replacing the actual brightness values of the sub-pixels in the second active area by the brightness values of the sub-pixels in the first region at the preset grayscale value based on a relative positional relationship between the first region and the second active area, wherein the first region is adjacent to the second active area.

* * * * *